Figure 1:
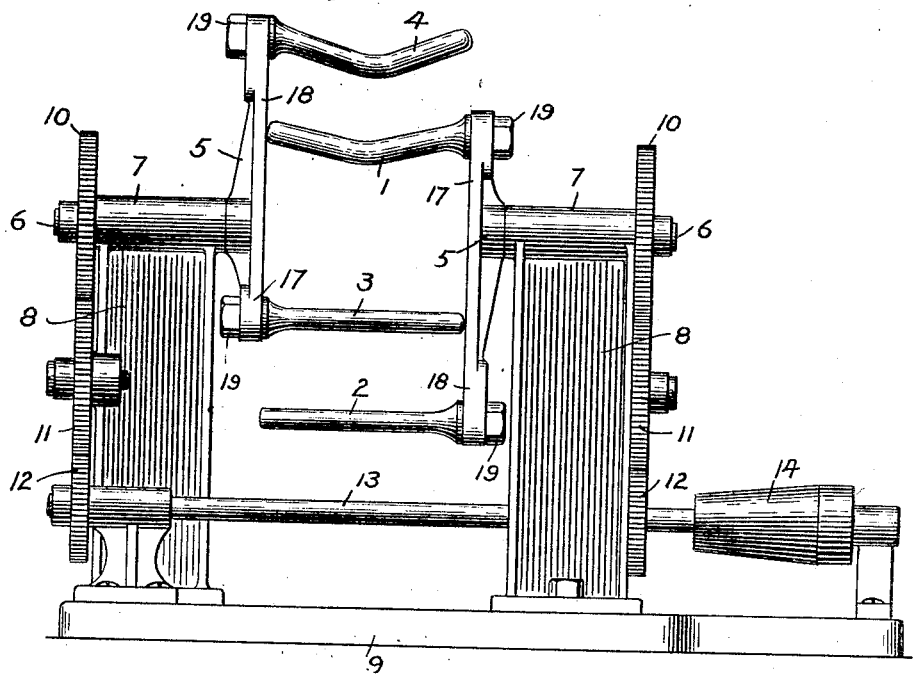

No. 857,770. PATENTED JUNE 25, 1907.
C. THIBODEAU.
CANDY PULLING MACHINE.
APPLICATION FILED NOV. 26, 1900.

3 SHEETS—SHEET 1.

Witnesses:
Walter E. Lombard

Inventor:
Charles Thibodeau

No. 857,770. PATENTED JUNE 25, 1907.
C. THIBODEAU.
CANDY PULLING MACHINE.
APPLICATION FILED NOV. 26, 1900.

3 SHEETS—SHEET 3.

Witnesses
Walter E. Lombard
O. W. Pizzetti

Inventor:
Charles Thibodeau
by Wright, Brown & Quinby
attys.

UNITED STATES PATENT OFFICE.

CHARLES THIBODEAU, OF SOMERVILLE, MASSACHUSETTS, ASSIGNOR, BY MESNE ASSIGNMENTS, TO EDWARD A. KITZMILLER, OF PITTSBURG, PENNSYLVANIA, AND ROBERT P. DUFF, OF SWISSVALE BOROUGH, PENNSYLVANIA, TRADING UNDER FIRM-NAME OF P. DUFF & SONS., OF PITTSBURG, PENNSYLVANIA.

CANDY-PULLING MACHINE.

No. 857,770.      Specification of Letters Patent.      Patented June 25, 1907.

Application filed November 26, 1900. Serial No. 37,734.

*To all whom it may concern:*

Be it known that I, CHARLES THIBODEAU, of Somerville, in the county of Middlesex and State of Massachusetts, have invented certain new and useful Improvements in Candy-Pulling Machines, of which the following is a specification.

This invention relates to a novel machine for pulling candy, such as molasses candy and other kinds, and it consists in certain novel features of construction and arrangement, fully described in the specification, clearly illustrated in the drawings and particularly pointed out in the claims.

Figure 2:
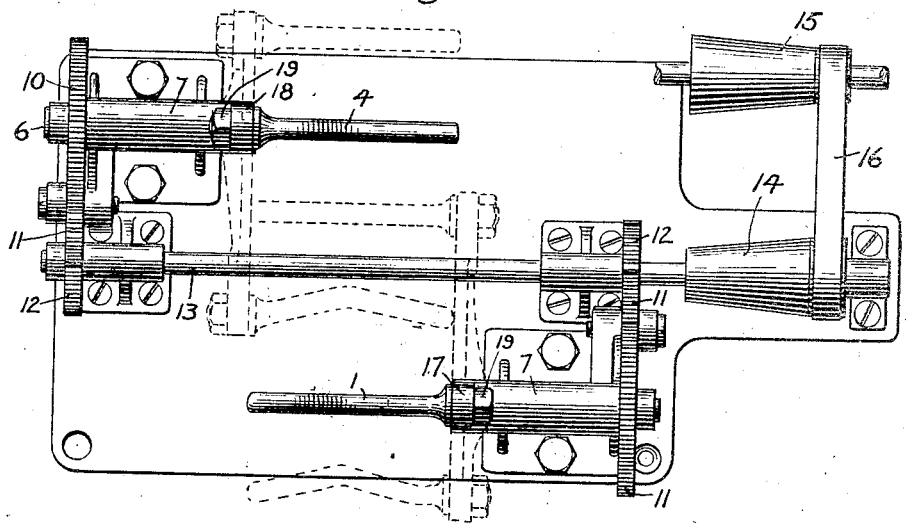
Figure 3:
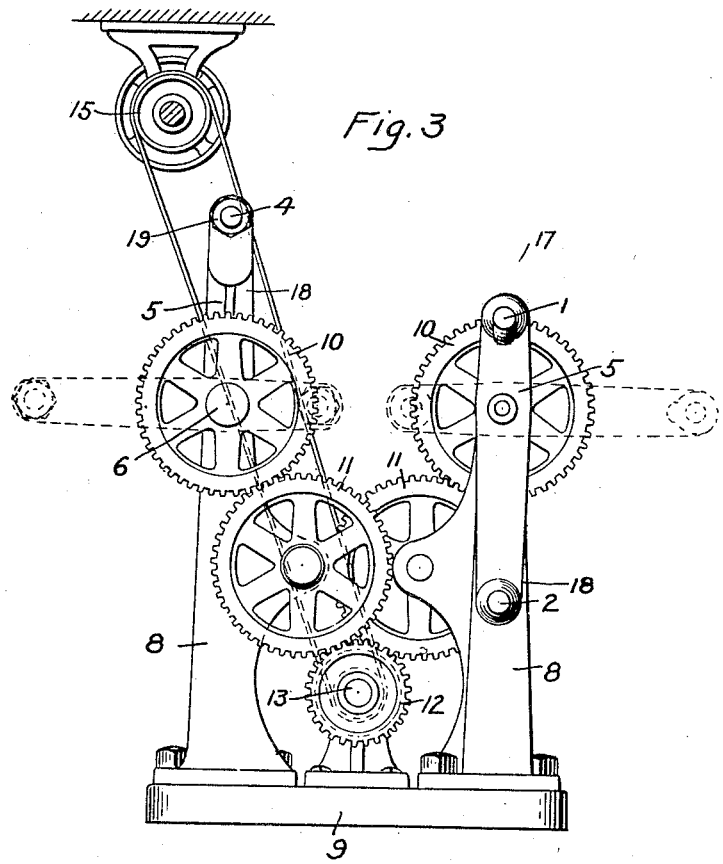
Figure 4:
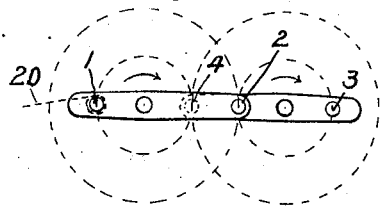

Of the accompanying drawings, forming a part of this specification,—Figure 1 represents an end elevation of a candy-pulling machine constructed in accordance with my invention. Fig. 2 represents a plan view thereof. Fig. 3 represents a side elevation. Figs. 4 to 13, inclusive, represent diagrammatic views, showing different positions of the working parts of the machine.

The same reference characters indicate the same parts in all of the figures.

Referring to the drawings, which show an embodiment of my invention selected by me for the purpose of illustrating the invention, 1, 2, 3 and 4 represent four substantially parallel pins secured to levers 5, 5. The levers 5 are secured to the inner ends of two shafts 6, 6, which are journaled in bearings 7, 7 at the upper ends of standards 8, 8, said standards 8, 8 being shown as mounted upon a base 9. Each shaft is provided with a gear 10, which meshes with an intermediate gear or idler 11, the latter in turn meshing with a gear 12. The two gears 12 are secured to a common drive-shaft 13, rotated in any suitable manner, as by means of cone-pulleys 14, 15, and a shifting belt 16, whereby different speeds of the said shaft may be obtained. By the described arrangement of shafts and gearing the levers 5, 5 are rotated in the same direction at an equal speed. Each lever has a short arm 17, and a long arm 18, at the ends of which arms the pins 1, 2, 3 and 4 are affixed. The said pins are thus located at unequal distances from their axes of revolution, the pins 1, 3 on the short arms 17 being located nearer to the shafts 6, 6 than the pins 2, 4 on the longer arms 18.

Figure 12:
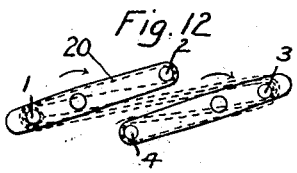
Figure 13:
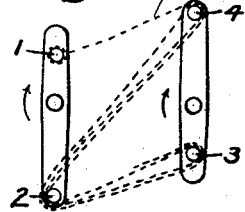

The pins 1, 2, 3 and 4 and their supporting shafts 6 are so related that the circles described by the pins 1 and 3, which are nearest the shafts 6, 6 do not intersect, while the circles described by the pins 2, 4, which are farthest away from the shafts 6, 6 intersect each other. The result of this construction is a novel action, the successive stages of which are represented in Figs. 4 to 13. Figs. 4 to 11 show the positions of the parts at quarter turns of the shafts 6, 6. Fig. 12 shows their positions at slightly less than a quarter turn from the positions shown in Fig. 11. Fig. 13 shows the positions at slightly more than a quarter turn from the positions shown in Fig. 12.

Figure 5:
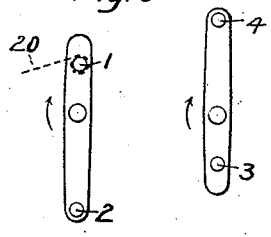
Figure 6:
Figure 7:
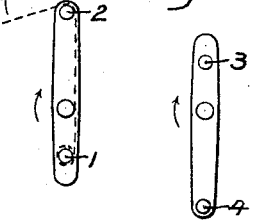
Figure 8:
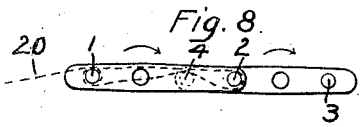
Figure 9:
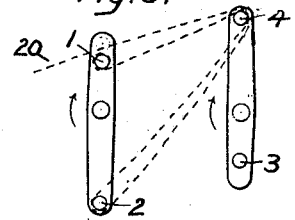
Figure 10:
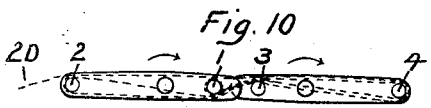
Figure 11:
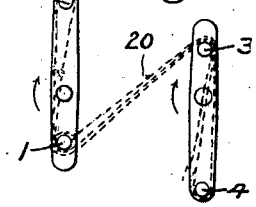

Let it be assumed that an elongated rope or batch 20 of candy has been attached to the pin 1, when the pins are all in one plane and the pins 2, 4 on the long arms of the levers have crossed each other's paths; a quarter turn of the shafts will bring the parts to the position represented in Fig. 5; another quarter turn causes the rope of candy to overlie the pin 2 of the same set as pin 1, as shown in Fig. 6; another quarter turn bends the rope 20 over pin 2, as shown in Fig. 7; another quarter turn causes the rope to be doubled on the pins 1, 2, and brings the pin 4 of the set on the other bracket underneath the doubled strands, as illustrated in Fig. 8; the next quarter turn brings the parts to the position represented in Fig. 9, in which the doubled rope supported by the pins 1, 2 has been pulled out or stretched into a loop by the pin 4. The next quarter turn brings the pins 1, 3 on the short arms adjacent to each other, with the pin 3 about to come into action, as shown in Fig. 10. It may be assumed that the feeding of the rope of candy is then discontinued and the machine has received its full quota. In the next quarter turn the pins 1, 3 draw away from each other and pull or stretch out the candy between them. In Fig. 12, which shows the parts just before the completion of the next quarter turn, the pins 2, 4 on the long arms are crossing each other's paths, and the candy, which is already in quadruple strands, is about to be doubled again on each set of pins. After the pins have come into the same plane, the next quarter turn brings them into the position shown in Fig. 13, in which both the pins 2 and 4 are exerting the action which the pin 4 is exerting in Fig. 9. The next quarter turn brings the parts again to the positions shown in Fig. 10, and the subsequent pulling is a repetition of the action shown in Figs. 10, 11, 12 and 13. The operation of my improved machine, therefore, causes the candy to be quickly and uniformly stretched out by the pins, which act as pullers. One pin in each set, as the pins 1 and 4 in the drawings, may be bent or bowed toward their axes of revolution, in order to keep the candy centered on the rods. In the operation of the machine the candy is not necessarily wound on the pins successively, as shown in Figs. 4 to 10, this method being selected merely to clearly illustrate the action of the machine. The candy may be applied to the machine in any suitable manner. For instance, when the parts have the positions represented in Fig. 6, the pins 1 and 3 being adjacent, a batch of candy may be wrapped around or molded on said pins 1 and 3 and the machine then started, whereupon, the action illustrated in Figs. 10 to 13 will soon ensue and be continuously repeated. In starting to work a batch of candy, the machine is preferably run slowly at first, and its speed gradually increased until the normal working speed has been attained.

In the operation of the machine the candy is alternately and automatically fed to the pins (see Figs. 9 and 12), then pulled (see Figs. 8 and 13), and then re-fed and re-pulled repeatedly, this operation continuing until the candy has been pulled to the desired extent. In feeding the candy to each other the revolving pins lap the same so that there is a continuous and alternate lapping and pulling or stretching of the mass. The pins move or revolve in vertical planes so that should the mass of candy stretch due to its weight it will be recovered and re-fed to the pins.

I do not confine myself to the exact construction shown, as various modifications may be made within the scope of the invention, which includes power-driven candy-pulling pins arranged to move in intersecting and non-intersecting paths, and to automatically feed and re-feed the candy to each other, and then pull and re-pull the fed and re-fed candy. In place of the pins, I may employ other forms of pulling members and the levers and pins may be differently arranged and positioned, so long as they operate in the described way. The path of motion of the pins may, if desired, be made that of polygons other than circles.

While the means for moving a part of the pulling members in intersecting circles and a part in non-intersecting circles, and the means for automatically causing the pulling members to feed and pull the candy, comprise in the form shown, the two levers with their offset pins and the gearing by which the same are driven, yet said levers and their driving mechanism may be variously arranged and other forms of driving mechanism may be employed, if desired, without departing from the spirit and scope of my invention.

I claim:

1. In a candy pulling machine, the combination of a plurality of co-acting pulling members mounted for movement, some in intersecting paths, and others in non-intersecting paths.

2. In a candy-pulling machine, the combination of a plurality of co-acting sets of pins, said sets having pins mounted for movement, some in intersecting paths and others in non-intersecting paths.

3. In a candy pulling machine, the combination of a plurality of co-acting pulling members mounted to revolve, some in intersecting circles, and others in non-intersecting circles.

4. In a candy-pulling machine, the combination of a plurality of co-acting sets of pins, said sets having pins mounted to revolve, some in intersecting circles and others in non-intersecting circles.

5. In a candy pulling machine, the combination of two substantially parallel off-set rotary shafts each carrying co-acting pulling members, and means to rotate said shafts.

6. In a candy-pulling machine, the combination of two substantially parallel offset rotary shafts having co-acting pullers, and means to rotate said shafts in the same direction at equal speeds.

7. In a candy pulling machine, the combination of two substantially parallel off-set rotary shafts having co-acting sets of pulling members, said pulling members being mounted to revolve, some in intersecting circles, and others in non-intersecting circles.

8. In a candy-pulling machine, the combination of two substantially parallel offset rotary shafts having co-acting sets of pins, said pins being mounted to revolve, some in intersecting circles, and others in non-intersecting circles, and means to rotate said shafts in the same direction at equal speeds.

9. In a candy-pulling machine, the combination of a plurality of pins mounted for movement in substantially parallel relation to each other in intersecting paths.

10. In a candy pulling machine, the combination of a series of candy pulling members, and means for imparting to a part of said members continuous circular movement in one direction.

11. In a candy-pulling machine, the combination of a plurality of pins mounted to revolve in intersecting circles.

12. In a candy pulling machine, the combination of a plurality of pins mounted to revolve in intersecting circles and moving in the same direction and at equal angular speeds.

13. In a candy pulling machine, the combination of a pulling member mounted to move in a circular path in one direction, and co-operating means movable to intersect the path of first named pulling member.

14. In a candy pulling machine, the combination of a pulling member mounted to move in a circular path in one direction, and a plurality of movable co-operating pulling members, one of which moves to intersect the path of said first named member.

15. In a candy pulling machine, the combination of a plurality of pulling members mounted to move in circular paths in one direction, and co-operating means movable to intersect the paths of one of said first named members.

16. In a candy pulling machine, the combination of a plurality of pulling members mounted to revolve in intersecting circles, and a member co-operating therewith.

17. In a candy pulling machine, the combination of a plurality of pulling members mounted to revolve in intersecting circles, and another member mounted to revolve in a circle and co-operating therewith.

18. In a candy-pulling machine, the combination of two substantially parallel offset shafts terminating short of each other, levers mounted on the adjacent ends of said shafts, and two pins mounted on each lever on opposite sides of its shaft-axis and projecting toward the opposite lever, said two pins being located at different distances from their shaft axes, the pins nearer the axis moving in non-intersecting paths, and those farther from the axis moving in intersecting paths.

19. In a candy-pulling machine, the combination of two substantially parallel offset shafts terminating short of each other, means for rotating said shafts in the same direction at equal speeds, levers mounted on the adjacent ends of said shafts, and two pins mounted on each lever on opposite sides of its shaft-axis and projecting toward the opposite lever, said two pins being located at different distances from their shaft-axis, the pins nearer the axis moving in non-intersecting paths, and those farther from the axis moving in intersecting paths.

In testimony whereof I have affixed my signature, in presence of two witnesses.

CHARLES THIBODEAU.

Witnesses:
A. D. HARRISON,
H. L. ROBBINS.